March 27, 1934.    J. C. CHAPPLE    1,952,420
FUEL SUPPLY SYSTEM
Filed Dec. 12, 1928    5 Sheets-Sheet 1
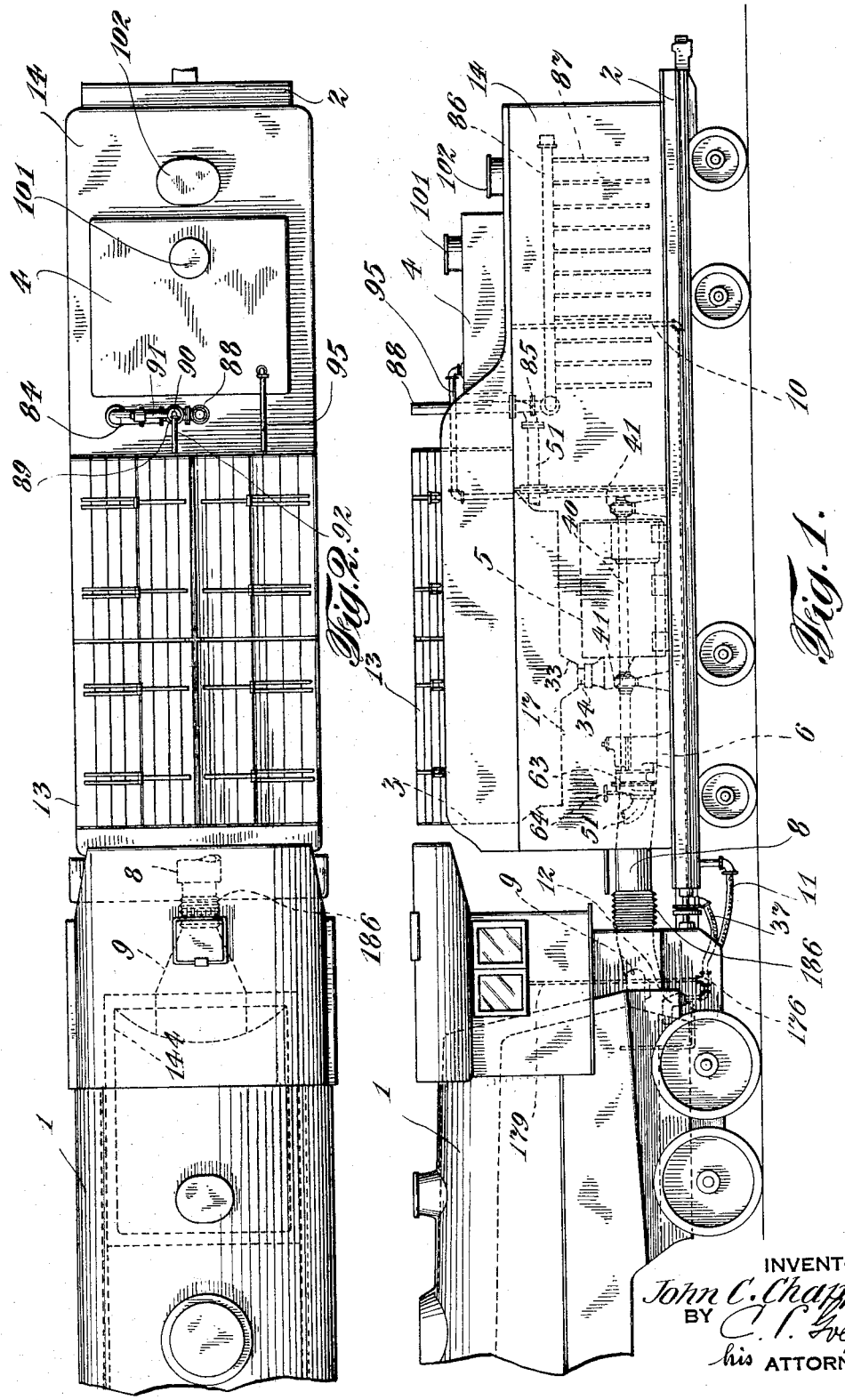
INVENTOR
John C. Chapple
BY
his ATTORNEY

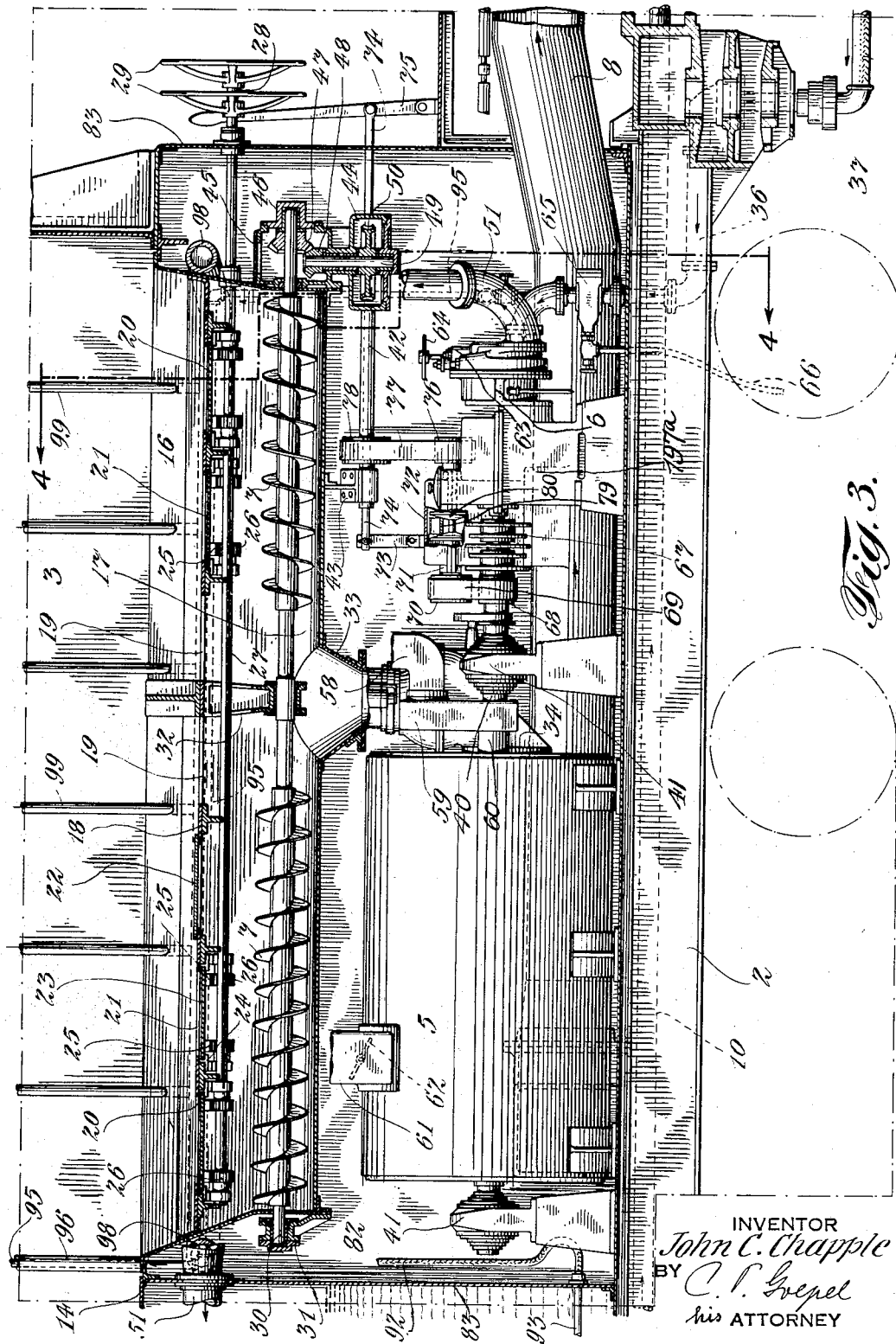

March 27, 1934.   J. C. CHAPPLE   1,952,420
FUEL SUPPLY SYSTEM
Filed Dec. 12, 1928   5 Sheets-Sheet 3

INVENTOR
John C. Chapple
BY
his ATTORNEY

March 27, 1934.  J. C. CHAPPLE  1,952,420
FUEL SUPPLY SYSTEM
Filed Dec. 12, 1928  5 Sheets-Sheet 4

INVENTOR
John C. Chapple
BY
his ATTORNEY

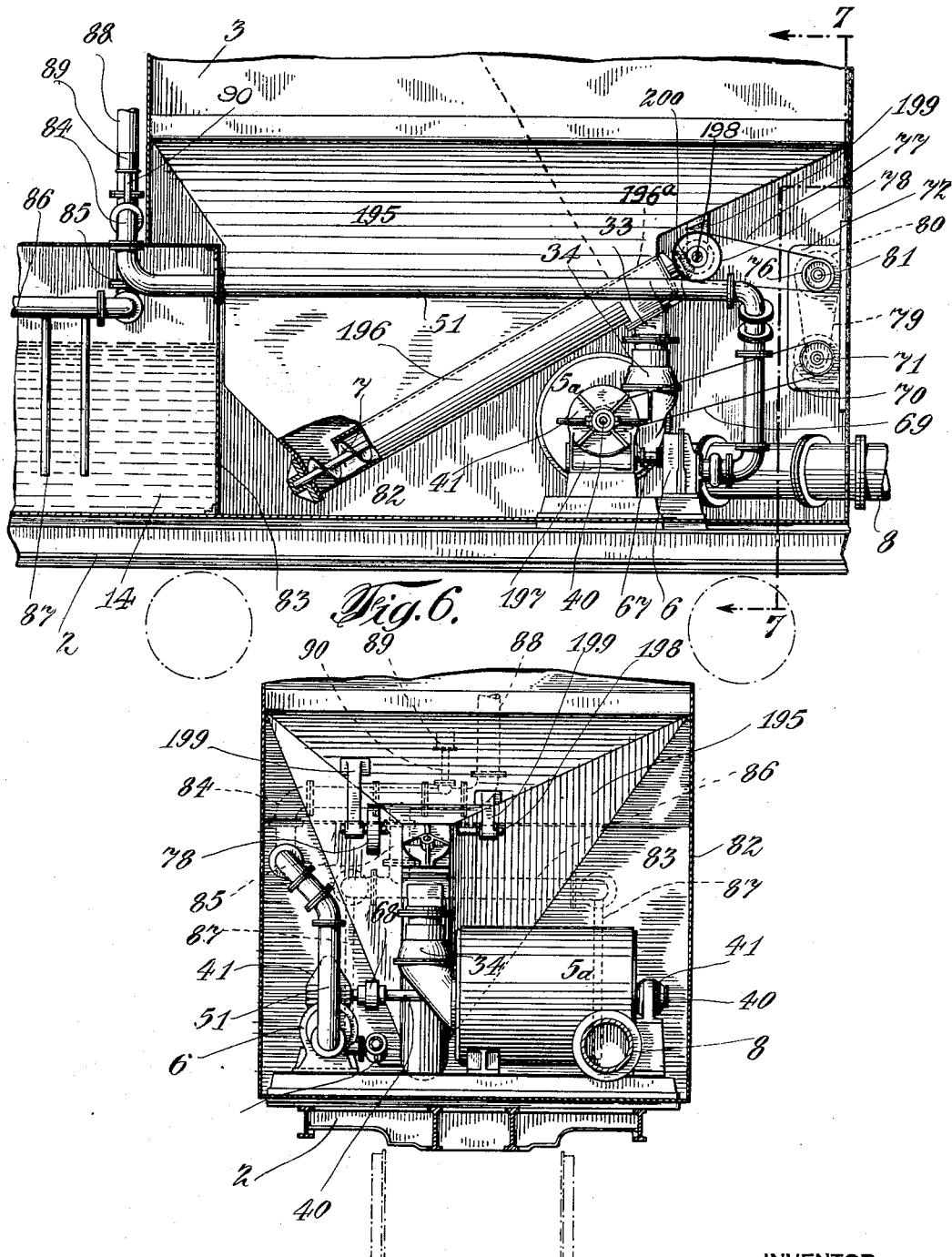

Patented Mar. 27, 1934

1,952,420

UNITED STATES PATENT OFFICE 1,952,420

FUEL SUPPLY SYSTEM

John C. Chapple, St. Louis, Mo.

Application December 12, 1928, Serial No. 325,603

6 Claims. (Cl. 110—104)

This invention relates to improvements in fuel supply systems; especially fuel supply systems for steam locomotives, motor cars, to be propelled by steam, and other steam generators.

An object of the invention is to provide a fuel supply system which is complete and unitary, compact in form and arrangement of parts and designed to store and treat fuel in the natural condition and convert it into the state required for most efficient use.

Another object of the invention is to provide a fuel system which can work with either liquid fuel, such as oil, and atomize the oil and mix it with air for complete combustion; or with solid fuel which is broken up and divided into small particles as powder and then fed with a sufficient volume of air into a furnace to be burnt.

Still another object of the invention is to provide a fuel supply system which can be advantageously disposed in a relatively small space on a vehicle to carry it; and readily operated to furnish sufficient heat to generate the amount of steam needed at any particular time.

Yet another object of the invention is to provide a fuel system adapted to furnish fuel in a state of division for rapid consumption without waste or loss of heat; and which comprises parts such that the movement of the fuel or the rate at which it is fed into the furnace can always be regulated in accordance with prevailing conditions.

The advantages of pulverized solid fuel for steam locomotives and the like have long been known; but the difficulties of supplying powdered fuel for the purpose of generating power to propel steam trains and other locomotives have been very hard to overcome. Attempts have been made in this field to utilize powdered coal or lignite by means of storage systems where fuel in pulverized form has been kept for transfer to the tender of the locomotive, for example, whence it is moved by suitable feeding and conveying mechanism to the furnace of the locomotive boiler. Such systems, however, have proved to be too expensive because they necessitated the installation of wayside fuel storage bins where the powdered fuel was prepared and kept, and gave rise to much delay when the fuel was taken from such bins and loaded into the locomotive tender; also considerable hazard was incurred on account of the danger from spontaneous combustion when the powdered coal, lignite, etc., was allowed to remain in the tender for any length of time. A further and greater hazard was the possibility of dust clouds being formed when transfer of the pulverized fuel was made from one container to another; these dust clouds being very inflammable and causing violent explosions when ignited. Further, when powdered coal was stored in the tender of the locomotive there was always the liability that the coal in that condition would pack down and arch over and thus interfere with a uniform and regular feed of the fuel to the furnace. Some other complications were encountered but need not here be enumerated; since it is sufficient to state that wherever equipment for utilizing powdered fuel in this manner was provided the use thereof generally had to be abandoned after a period of time.

The invention set forth herein obviates the objections and drawbacks heretofore incident to the utilization of powdered fuel because this system permits the fuel to be received and stored in the tender of the locomotive in the natural condition from wayside supply points. The system comprises means for automatically pulverizing the fuel and then conveying it through a suitable conduit to the burner, which extends into the furnace of the boiler, so that the fuel will be consumed at the point where the heat will have the greatest effect. In practice, the system requires very little power in its operation; and as the fuel is pulverized or otherwise reduced to a finely divided condition and burnt, at the same time the delays and risks heretofore met with in this branch of combustion engineering are entirely removed.

In this application I illustrate my improved fuel supply system in connection with a locomotive and tender for use in the movement of railroad trains. The system, however, can just as well be used on steam vessels, motor cars, steam tractors, or even in stationary plants which produce steam for the operation of machines for manufacturing and other industries.

The essential parts of the invention may be briefly stated as follows:

First, a locomotive tender or other storage device providing an enclosed space in which the "raw" fuel, that is to say, the fuel before pulverization, can be stored; and adjacent thereto a fuel pulverizer to break up the solid fuel in any given quantity.

Second a conduit for delivering the finely divided fuel to a burner in the furnace.

Third, controlling mechanism so that the operation of the pulverizer and the supply of coal and air to the pulverizer, and the supply of air to the furnace, can be regulated from the cab of the locomotive.

Fourth, a preheater for heating air to be supplied to the mixture of air and powdered coal on its way to the burner.

Fifth, means for preheating the air which passes through the pulverizer.

For the operation of the turbine a supply of superheated steam is preferable. Furthermore, it is preferable that this superheated steam is furnished from an auxiliary superheater independent of the main superheater for the locomotive cylinders.

Further objects and advantages of the invention are made plain in the following description, taken with the accompanying drawings which show a practical embodiment of the invention. This disclosure, however, is illustrative only; and changes may be made in the shape, size and arrangement of the various parts without going beyond the principle of the invention or exceeding the scope of the appended claims.

In the drawings,

Figure 1 shows a side view; and

Figure 2 a top plan of part of a locomotive with a tender attached equipped with a supply system according to my invention;

Figure 3 is a vertical longitudinal section taken through the front portion of the tender of the locomotive showing the parts of my fuel supply system;

Figure 6 is a longitudinal sectional view through the front part of the tender of the locomotive showing a modification;

Figure 7 is a section on the line 7—7 of Figure 6;

The same numerals identify the same parts throughout.

Figure 4:
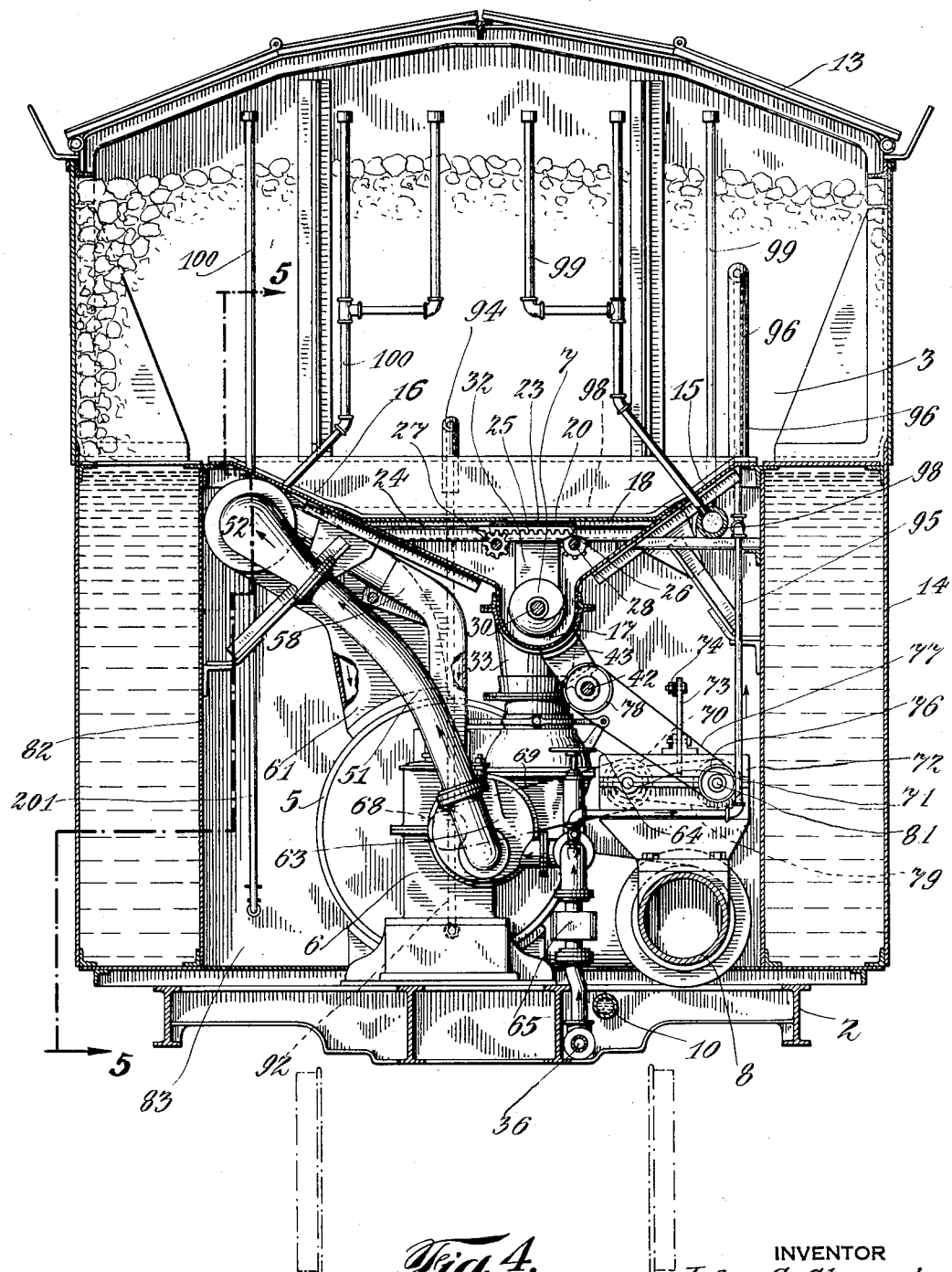
Figure 4 is a transverse vertical section on the line 4—4 of Figure 3.

In the form of the invention shown in the drawings, the numeral 1 indicates part of a locomotive to the rear end of which, bearing the cab, is coupled the tender 2. The front half of this tender encloses a storage space 3 for solid fuel such as coal in the natural condition and behind this space 3 is a fuel tank 4; both the fuel tank and the storage space for coal being at some height above the floor of the tender. On the floor of the tender beneath the storage space 3 is a pulverizer 5 and a steam turbine 6 which operates the pulverizer 5 and is supplied with steam from the boiler of the locomotive 1. The solid fuel is moved in its raw state by screw conveyers 7 (Figure 3) which carry the coal to a chute which enters the pulverizer 5. After being broken up and divided, in this pulverizer, the powdered fuel mixed with air is conducted to the furnace of the locomotive through a conduit 8 which leads to a burner 9 in the locomotive. An oil conduit 10 connects this burner 9 with the oil tank 4; and the pipe 10 is united by means of a flexible section or hose 11 to the part 12 of the burner 9 by which the oil is atomized. The cover for the coal storage bin 3 is shown at 13 and at the rear end of the tender is a compartment 14 enclosing a chamber wherein the exhaust steam from the turbine 6 is condensed. The tank 4 rests upon the top of this compartment 14 and the chamber within this compartment extends forward along the sides of the tender and closes the sides of the space beneath the bin 3 where the pulverizer 5 and the turbine 6 are mounted.

By reason of the fact that my system includes means for supplying not merely solid fuel in powdered form but also liquid fuel in a state of atomization the locomotive can take on a supply of either kind of fuel and operate in places where one or the other kind can not be had. For example, if coal is plentiful the bin 3 can be filled but in regions where coal is not available oil can be used instead. Likewise the locomotive can carry both kinds of fuel and both kinds can be consumed on a long run.

I shall first describe the storage bin 3, referring for this purpose particularly to Figures 3 and 4. This bin has a bottom which slopes downward at the sides as shown at 15 and 16 and the sides unite at the lowermost parts to provide the channel or trough 17 in which the screw conveyers 7 are mounted. These conveyers are rotated by a single shaft but work in opposite directions to force the fuel from the ends of this trough towards the middle. Above the bottom and sloping sides is a secondary bottom 18 which overlies the conveyer screws 7, and in this bottom 18 directly above the screws are two openings 19 near the middle of the bin. These apertures or openings are normally uncovered so that the fuel can drop through them into the middle portion of the channel 17. At the ends of the bin are outlet apertures 20 and between these outlet apertures 20 and the outlet aperture 19 are other outlet apertures 21. At the end adjacent the outlet aperture 21 towards the rear of the tender is an additional aperture between this aperture 21 and the nearest aperture 19; and normally closed by the cover 22. This aperture may be opened if desired and while I have shown only two apertures each at 19, 20 and 21, I may, of course, vary the number if necessary.

Beneath each of the apertures 20 and 21 are sliding closures 23, the edges of which are engaged by flanges or angle bars 24. The lower faces of these covers 23 carry racks 25 in mesh with pinion 26. The pinions 26 for engaging the racks on the lower faces of the covers for the outlets 20 are made fast upon a shaft 27 mounted in bearings and extending longitudinally of the tender beneath the secondary bottom 18. The other pinions 26, which mesh with the racks 25 on the bottoms of the covers 21 are secured to a shaft 28 running alongside the shaft 27. The shafts 27 and 28 project beyond the front of the tender and carry hand wheels 29 so that they can be reached by the fireman in the cab of the locomotive and turned. With these wheels 29 the covers for the openings 20 and 21 can be moved back to clear these openings in whole or in part. After all the coal is used above apertures 19, apertures 21 are opened and after coal supply above these is exhausted apertures 20 are opened. This procedure is followed so that conveyer 7 will not become choked or clogged. Conveyer 7 has capacity to furnish maximum fuel from each aperture 20 or 21, the amount fed to pulverizer 5 being controlled by speed of conveyer 7.

The shaft for the screw conveyer 7 is indicated at 30 and it is mounted in a bearing 31 at the rear end of this trough. In the middle this shaft is supported in a bearing 32 attached to the lower face of the secondary bottom 18; and at the middle of this trough is the discharge spout 33 which is connected by a discharge conduit 34 with the casing of the pulverizer 5. This pulverizer may be cylindrical in shape with its axis arranged lengthwise of the tender. The fuel enters the casing of the pulverizer at the front end and after being broken up comes out through one side near the rear end to which the main fuel conduit 8 is connected. The turbine 6 receives steam through suitable supply connections from the locomotive boiler, parts of which are indicated at 36 and 37.

The main shaft 40 of the pulverizer projects at the ends of the casing thereof and is mounted in bearings 41. This shaft is connected to be driven from the shaft of the turbine 6 and shaft 40 of the pulverizer also operates through the change speed gearing to be presently described, a shaft 42 from which motion is transmitted to the shaft 30 of the conveyer 7. The shaft 42 is supported at one end in a bearing 43 attached to the lower side of the conveyer trough 17 and at its opposite end it carries a worm gear, not shown, within a gear casing 44. At one end of conveyer trough 17 is a casing 45 into which the shaft 30 extends, the end of this shaft being engaged by a bearing 46 on the casing 45. This end of the shaft 30 carries a miter gear 47 turned by a miter gear 48 on the shaft 49 which enters the casing 44 and carries therein a worm wheel 50 meshing with the worm on the shaft 42. Hence whenever the shaft 42 is turned the screw conveyer must operate.

Figure 5:
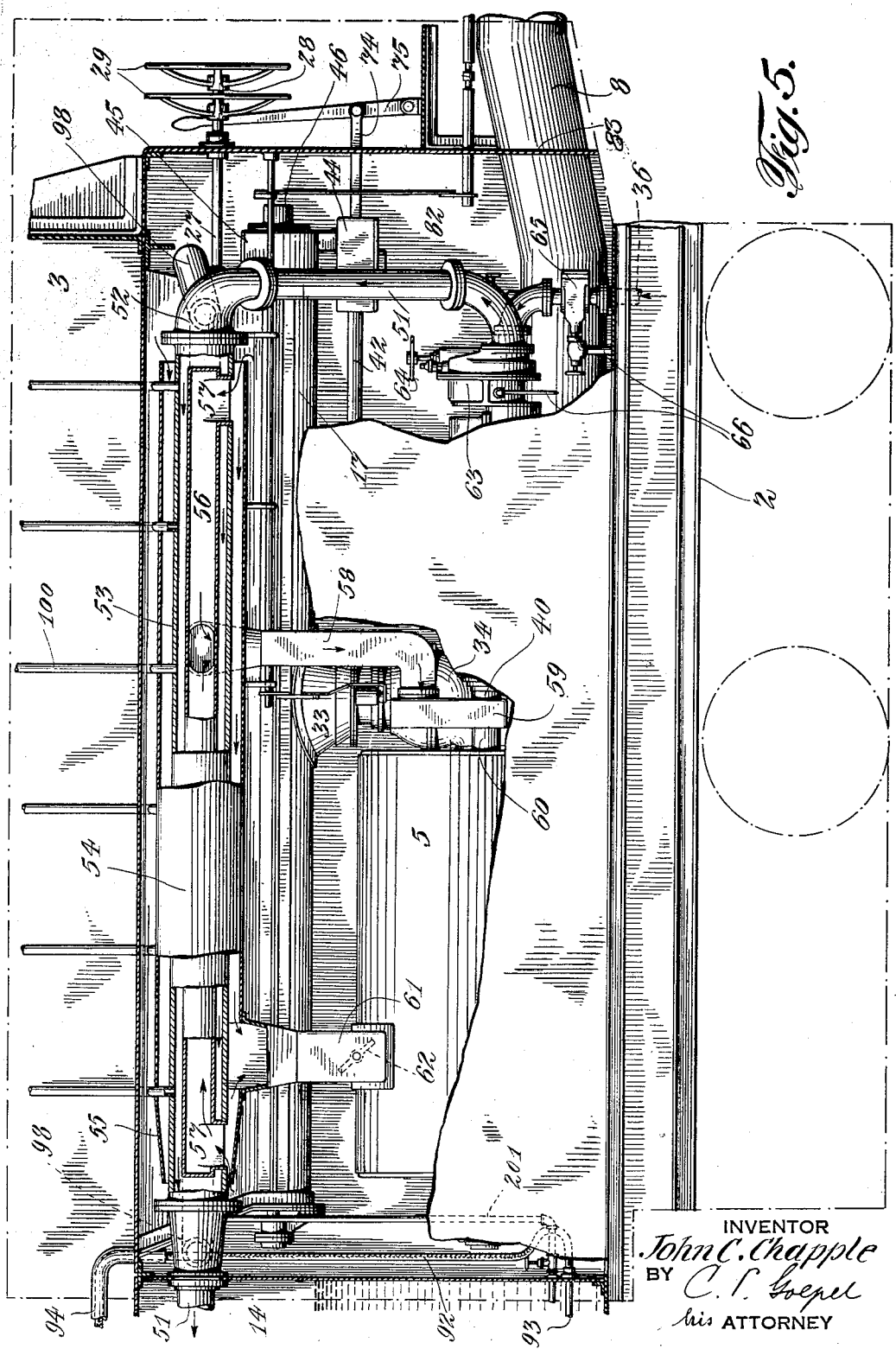
Figure 5 is also a vertical longitudinal section taken through the front part of the tender of the locomotive on the line 5—5 of Figure 4.

From the casing of the turbine runs an exhaust steam conduit 51. This conduit extends upward and towards one side of the tender and includes an enlarged or flaring section 52 connected to a tubular steam heating chamber 53 which runs longitudinally of the tender at one side of and parallel with the conveyer trough 17. Reference is here made especially to Figures 4 and 5. The tubular chamber 53 is enveloped by a tubular jacket 54 open at both ends but contracted somewhat at its rear end as shown at 55. The rear end of the tubular heating chamber 53 communicates with the rear section of the exhaust conduit 51 to discharge steam from the turbine into the water space at the rear of the tender as will be described presently. Inside of the tubular heating chamber 53 is a tubular air heating chamber or header 56. This chamber communicates at its ends through inlet openings 57 with the space between the chamber 53 and the jacket 54. Thus air can flow along the inside of the jacket where it is heated by contact with the exterior surface of the chamber 53 and then inside of the header where it is heated still further by the steam in the chamber 53. The header 56 has an outlet opening adjacent the middle which leads to a flue 58 passing through the chamber 53 and jacket 54 to a connection 59 which communicates with the front end of the casing of the pulverizer 5 as shown at 60. Connected with the jacket 54 adjacent the rear end is another conduit 61 containing a damper 62 and leading to the interior of the casing of the pulverizer 5 through the top thereof at the rear end. Thus the exhaust steam from the turbine warms the air mixed with the powdered fuel produced by the pulverizer with the result that the temperature of the fuel-air mixture is raised and combustion in the locomotive furnace can take place more thoroughly and more quickly. The hot air flowing into the front part of the pulverizer through the conduit 58 meets the fuel entering through the chute 34 and is mixed therewith during the pulverizing process when the fuel in the pulverizer is broken up and divided. The hot air thus flowing into the front of the pulverizer I term herein primary or vehicle air because it acts as a carrier for the fuel when the coal or the like is divided in the pulverizer 5; and the heated air which enters the pulverizer through the conduit 61 can be termed secondary or combustion air because it is added to the air in the pulverizer which carries the pulverized fuel and flows out with the mixture of pulverized fuel and air through the main supply conduit 8 which leads to the burner 9. The fuel, when it arrives at the burner 9, is therefore in the best possible condition for burning. The temperature has been raised somewhat by contact with the heated air and the fuel has been divided and the relatively high temperature makes it ignite at once and burn without waste or smoke.

I do not show the internal construction of the pulverizer 5 as this pulverizer may be of the same design as the pulverizer shown in my copending application for patent on a pulverizer, Serial No. 304,240, filed September 6, 1928.

This pulverizer may also be so constructed that it is equipped with a by-pass air conduit connected at one end to the fuel chute 34 and at the other end to the interior of the casing of the pulverizer 5 at a point near the outlet leading to the conduit 8. When such a by-pass is present the smaller particles of fuel which are already in the powdered form will be divided so that only the larger particles or lumps will be caused to move into the pulverizer to be broken up by the beaters therein. When the larger lumps have been broken up and divided to the extent required and carried through the pulverizer nearly to the point of discharge they will be met by the current of air flowing through the by-pass and the smaller diverted particles and those which have been produced by the action of the beating will then be all mixed together. Such a construction is fully disclosed in my above-mentioned copending application and I mention it here because with such a construction the capacity of the pulverizer can be increased and the power needed for operating it reduced.

The pulverizer as shown in Figures 1, 3, 4 and 5 has its axis arranged lengthwise of the tender, as stated. In another form of my invention this pulverizer may be mounted in transverse position to save space, as will be described later.

Between the turbine 6 and the adjacent end of the steam supply conduit 36, I may locate a suitable casing 63 for the valves and other controlling devices for the turbine 6. The stem of one of these valves is shown projecting to the outside of the casing 63 with a hand wheel 64 thereon in the line of the steam pipe 36. I may also use a steam trap 65 having a drain pipe 66 with controlling valve. A similar drain pipe for condensed steam may be attached to the turbine 6.

I shall next describe the gearing through which the shaft of the turbine 6 turns the shaft 42 which operates the conveyer 7. The shaft of the turbine is shown at 67 united through reducing gears enclosed in casing 197a to the shaft 40 of the pulverizer 5 by any suitable means. This shaft 40 carries a pulley 68 joined by a belt 69 to the pulley 70 on the shaft 71, parallel to the shafts 42 and 40. The shaft 71 is mounted in a casing 72 which encloses the speed change mechanism; and this speed change mechanism is controlled by an arm or lever 73 connected thereto and projecting to the outside of the casing 72 and united by a link 74 to a lever 75 at the front of the tender within reach of the fireman in the cab of the locomotive. 76 is a pulley joined by a belt 77 to a pulley 78 on the shaft 42. The change speed mechanism inside of the casing 72 is of a well known design and comprises a belt 79 which is V-shaped in cross-section and runs between a pair of cone-shaped discs 80 at each side. One pair of these cone-shaped discs 80 is shown as mounted on the shaft 71 and another pair is carried by a shaft 81 which extends out of the casing 72 and has secured to its outer end the pulley 76. The distance between the discs 80 of each pair can be regulated, that is to say, these discs are keyed upon their respective shafts but can slide towards and from each other. If they are drawn apart, the belt 79 can move in closer to the axis of the shaft carrying the discs; and if they are caused to approach, the belt must pass between these cone-shaped discs at a greater distance from the axis of the shaft carrying them. Hence any range of speed of transmission between the shaft 40 and the shaft 42 can be obtained. When one pair of cone-shaped discs 80, such as the pair on the shaft 71, is moved apart, the pair on the other shaft 81 move together, and the effect is the same as if the belt 79 runs over two pulleys of unequal size and with relatively adjustable diameters.

The above described mechanism comprising the pulverizer 5, turbine 6, change speed mechanism between the turbine and the shaft 42, and the preheater along the conveyer trough 17, is all arranged beneath the storage bin 3 and in front of the water reservoir 14. The chamber within this compartment 14 may be extended forward along the sides of the tender to the front, as indicated in Figure 4, and the space for the pulverizer, etc., is separated from the water in the reservoir 14 by two side partitions 82 and a rear partition 83. The front of this space may be closed by a similar partition 83, but this last-named partition 83 may be removable, or may have the form of a door to give access to the interior of the space between the walls 82.

Besides utilizing the exhaust steam of the turbine 6 to heat the air which is mixed with the powdered fuel, I employ some of this exhaust steam to dry and warm the coal in the bin 3; see Figures 3 and 4. Connected at both ends with the exhaust pipe 51 adjacent the two extremities of the air preheating jacket is a pipe 98 which extends along the tender parallel to the casing 53 at the opposite side of the tender and from this pipe rise stand pipes 99. The steam casing 53 has similar pipes 100 connected thereto and extending into storage bin 3. These pipes are capped and fitted with air escape valves at their ends so that the steam may fill them and dry and warm the coal without escaping. The oil tank 4 has an inlet opening closed by a cover 101, and the reservoir 14 has a similar opening closed by a cover 102.

Figures 6 and 7 show a modification wherein the bin 3 has a bottom with sloping sides 195 which unite with an inclined feeding tube 196 for a single conveyer screw 7. Beneath the upper end of the conveyer tube 196 is a pulverizer 5a in transverse position; this pulverizer being driven by a turbine 6, the shaft 67 of which is connected to the shaft 40 of the pulverizer through intermediate gearing 197. The shaft 40 of the pulverizer bears a pulley 68 from which runs a belt as before. The change speed gearing in the casing 72 is mounted on the inside of the front wall of the tender. Thus all of the space beneath the bin 3 to the rear of the pulverizer is saved and by extending the bin down into this space the capacity of the bin is enlarged. The belt 77 transmits motion from the change speed mechanism to a pulley 78 on a shaft 198 supported in bearings 199 on the bottom of the bin 3; and this shaft also carries a miter gear to mesh with the miter gear 200 on the projecting end of the shaft of the conveyer 7. With this modification the passage of fuel from the bin 3 to the conveyer tube 196 always takes place at the lower end of this tube which is open, and the screw 7 lifts the fuel to the outlet spout 33 at the top of the tube 196.

I may also provide another opening in the tube 196 at the top where this tube unites with the chute 34. This additional opening is indicated by the numeral 196a, and it will allow the coal in the upper part of the container above the inclined broken line to flow down through the chute 34 of the pulverizer without operating the conveyer 7. This additional opening 196a will also serve to discharge the solid fuel from the conveyer tube 196 back into the bin or container 3 if the conveyer 7 under any conditions feeds the coal into the chute 34 too fast for the pulverizer, or in the event that the chute 34 should become partly clogged. The coal will then be moved by the conveyer 7 upwards towards the opening 196a and then back into the bin.

I may of course also use my fuel system in connection with a stationary plant as well as upon a locomotive or motor car since finely divided or pulverized fuel may be obtained in the manner shown in fixed as well as moving installations.

I claim:

1. In combination with a fuel pulverizer and steam operated power unit connected therewith, said pulverizer having a fuel inlet at one end and a fuel outlet adjacent its opposite end, a conduit receiving exhaust steam from said power unit, air receiving chambers respectively arranged interiorly and exteriorly of said conduit, means connecting one of said chambers with the fuel inlet of the pulverizer to supply heated air thereto, and means connecting the other of said chambers with said pulverizer adjacent the fuel outlet thereof to supply heated air to the pulverized fuel.

2. In combination with a fuel pulverizer having a fuel inlet at one of its ends and an outlet adjacent its opposite end and a steam operated power unit connected with the pulverizer; a conduit receiving exhaust steam from said power unit, an air receiving jacket surrounding said steam receiving conduit, an air receiving chamber within the conduit in communication at its opposite ends with said jacket, means connecting said chamber intermediate of its ends with the fuel inlet of the pulverizer to supply preheated air thereto, and means connecting said jacket with the pulverizer adjacent the outlet thereof to supply preheated air to the pulverized fuel.

3. In combination with a fuel storage chamber, a fuel pulverizer mounted below the same and a steam operated power unit connected with said pulverizer; air supply means for the pulverizer, means for utilizing a part of the exhaust steam from said power unit for preheating the air supplied to the pulverizer, and means for utilizing another part of the exhaust steam from said power unit for heating the fuel contained in said storage chamber.

4. In combination with a fuel storage chamber, a fuel pulverizer mounted below the same and a steam operated power unit connected with said pulverizer; means for feeding fuel from the storage chamber into one end of the pulverizer, a conduit receiving exhaust steam from said power unit, an air receiving chamber within the conduit, means connecting said chamber with the fuel inlet of the pulverizer to supply preheated air thereto, and means receiving steam from said conduit and extending into the storage chamber to heat the fuel contained therein.

5. In combination with a fuel storage chamber, a fuel pulverizer mounted below the same and a steam operated power unit connected with said pulverizer; means for feeding fuel from the storage chamber into one end of the pulverizer, a conduit receiving exhaust steam from said power unit, an air receiving chamber within the conduit, means connecting said chamber with the fuel inlet of the pulverizer to supply preheated air thereto, an additional air receiving chamber surrounding said conduit and connected with the pulverizer at a point remote from its fuel inlet to supply additional preheated air thereto, and means receiving steam from said conduit and extending into the storage chamber to heat the fuel contained therein.

6. In combination with a fuel storage chamber, a fuel pulverizer mounted below the same and a steam operated power unit connected with said pulverizer; means for feeding fuel from the storage chamber into one end of the pulverizer, a conduit receiving exhaust steam from said power unit, an air receiving chamber within the conduit, means connecting said chamber with the fuel inlet of the pulverizer to supply preheated air thereto, an additional air receiving chamber surrounding said conduit and connected with the pulverizer at a point remote from its fuel inlet to supply additional preheated air thereto, and longitudinally spaced stand pipes connected with said conduit to receive steam therefrom extending into said storage chamber to heat the fuel contained therein.

JOHN C. CHAPPLE.